July 24, 1951   J. W. ORNELL   2,561,590
INTERNAL-COMBUSTION ENGINE
Filed April 30, 1949   4 Sheets-Sheet 1
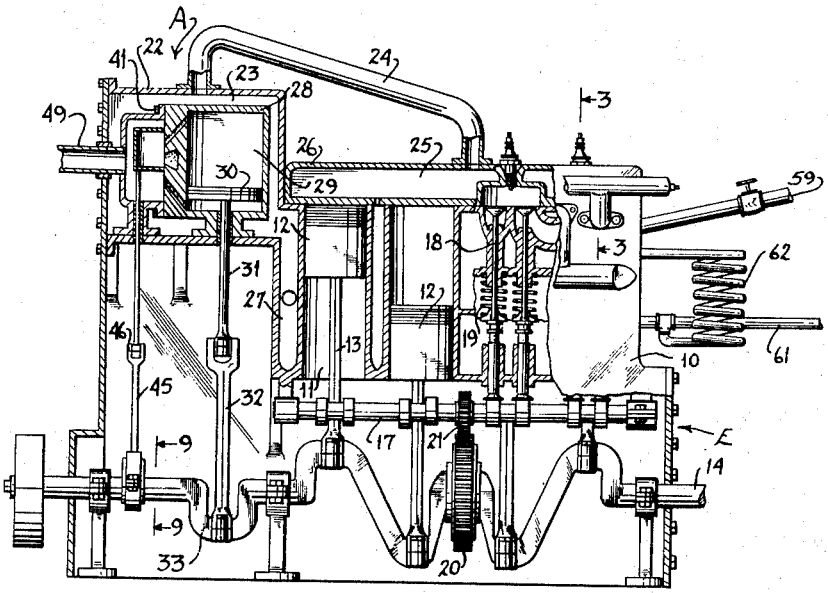
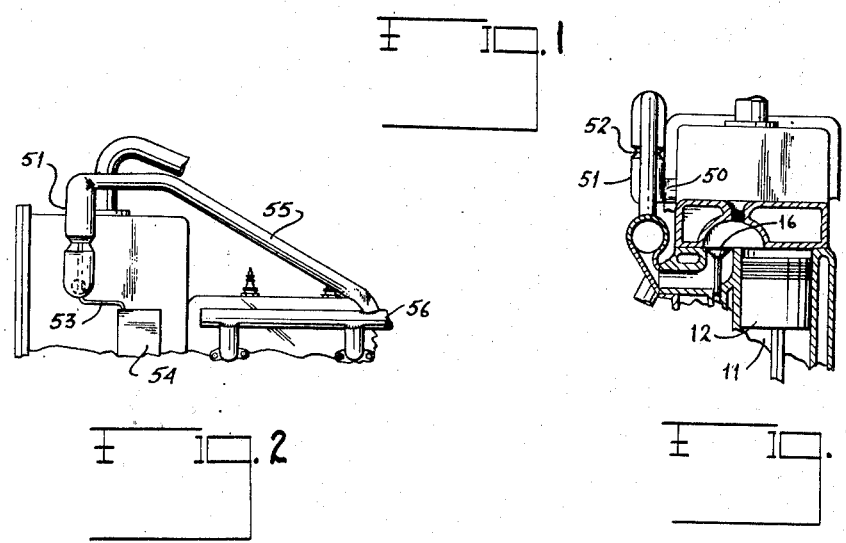
Inventor
JOHN WERNER ORNELL
By Joshua R. H. Potts
His Attorney Inventor
JOHN WERNER ORNELL
By Joshua H. Potts
His Attorney

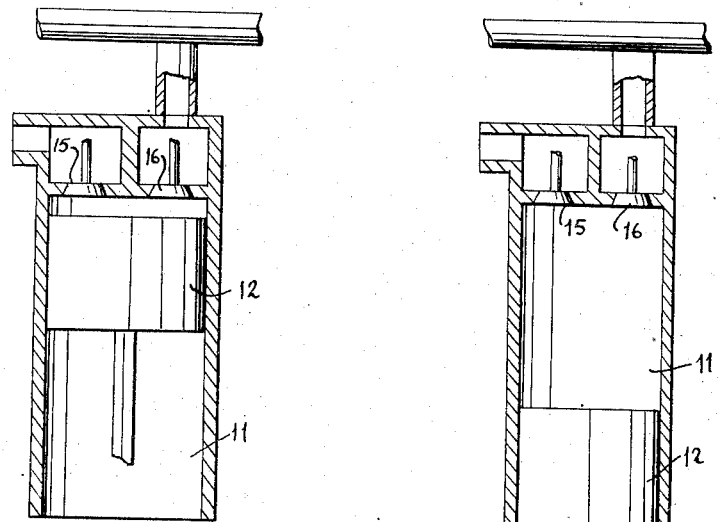
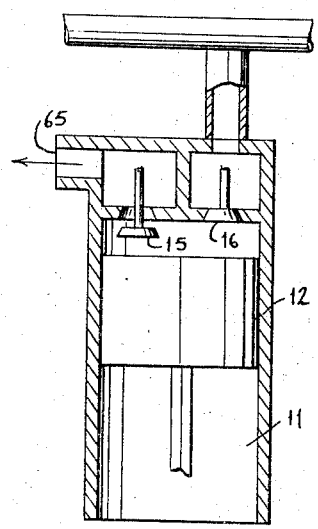
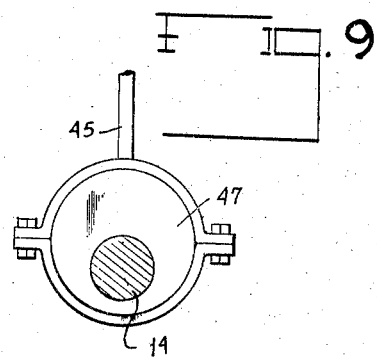

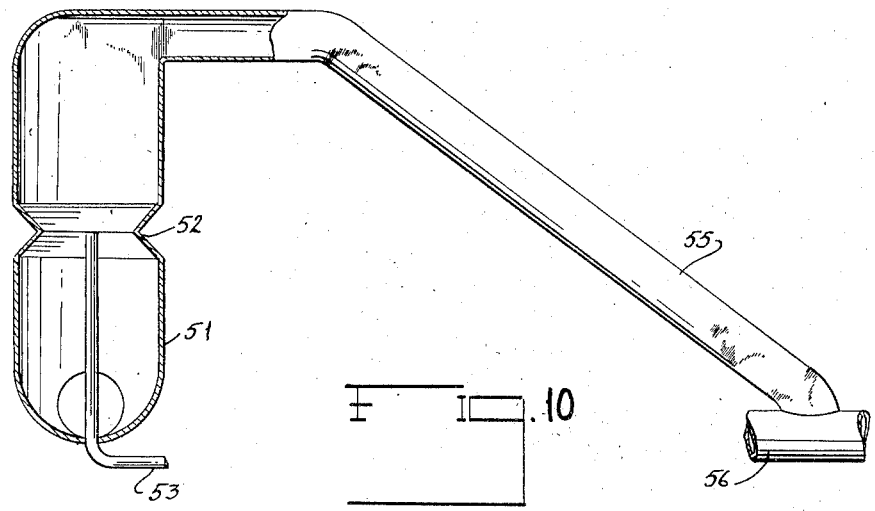
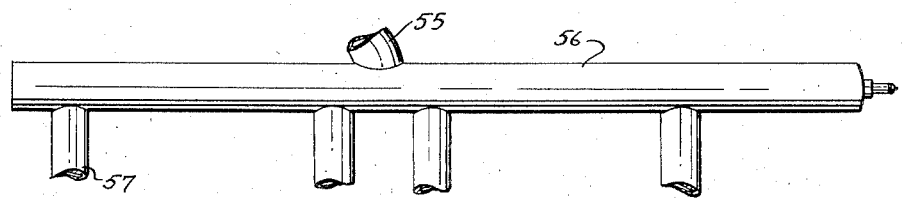
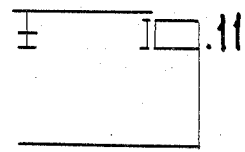

Patented July 24, 1951

2,561,590

UNITED STATES PATENT OFFICE 2,561,590

INTERNAL-COMBUSTION ENGINE

John Werner Ornell, Philadelphia, Pa.

Application April 30, 1949, Serial No. 90,693

3 Claims. (Cl. 123—142.5)

This invention relates to internal combustion engines and is concerned primarily with the delivery of air to each cylinder of an engine on the intake stroke thereof.

The present invention deals particularly with a four cylinder, four cycle engine or any four cycle engine including cylinders in multiples of four. In a four cycle engine one of the four strokes of each cycle is the intake stroke. This is the stroke on which air either alone or carrying a fuel mixture is drawn into the cylinder. The action is essentially one of suction and requires a certain amount of power on the part of the piston of that particular cylinder.

The present invention has in view as its foremost objective the provision of an internal combustion engine, of the type indicated, which includes means for delivering air to each cylinder on the intake stroke by positive displacement rather than the suction which has heretofore been used.

More in detail, the invention has as an object the provision of an internal combustion engine of the type noted which includes an air cylinder and piston assembly, the piston of which is driven from the crank shaft of the engine and the cylinder of which communicates with a manifold that is placed in communication with the cylinders in succession on the intake strokes.

In providing for the conduction of air from the cylinder of the air assembly to the cylinders of the engine proper, it is necessary to employ a valve that is automatically operable. Thus, another object of the invention is to provide, in an internal combustion engine of the character indicated, a slide valve which controls the flow of air from the cylinder to the air assembly and which slide valve is automatically operated by the crank shaft.

In accordance with modern practice, some internal combustion engines operate on the fuel injection principle; that is, the fuel is injected directly into the cylinders. With engines of this type the air is delivered into the cylinders on the intake stroke by positive displacement caused by the operation of the air assembly. However, another type of engine which is meeting with widespread use operates on the principle of carbureting the fuel; that is, the fuel is mixed with the air prior to delivery to the cylinder. The present invention is intended to be used with such engines in which the fuel is carbureted; and a further object is to provide, in such an engine, a carburetor which will carburet the fuel and mix it with the air prior to the delivery by positive displacement to the cylinders of the engine on the intake strokes. Certain important phases of the invention are tied up with the manner in which the carburetor is included in the conduit which conducts fuel from the air assembly to the engine manifold.

Every internal combustion engine includes a cooling system of some sort and the type of cooling system most commonly employed is that in which water is circulated about the several cylinders of the engine. From the very nature of the cooling operation, this water takes heat from the cylinders.

The invention has as a further object the provision, in an internal combustion engine of the character indicated, of means for preheating the air prior to delivery to the cylinders. This means preferably takes the form of a jacket that is disposed about the air cylinder and which communicates with the circulatory system of the engine. Thus, water from this cooling system will circulate about the air cylinder and due to its heated condition preheat the air.

Under practical conditions it usually takes some little time for the engine to heat up. Thus, the engine has as a further object the provision, in an engine of the type noted, of a circulatory cooling system which includes a coil that is adapted to be subjected to the influence of a torch or other heating medium so that the water in the system may be preheated to a required degree and thereby facilitate starting an initial operation of the engine.

Various other more detailed objects and advantages of the invention such as arise in connection with carrying out the above noted ideas in a practical embodiment will, in part become apparent, and in part be hereinafter stated as the description of the invention proceeds.

The invention, therefore, comprises a four cylinder, four cycle internal combustion engine including an air piston and cylinder assembly, which delivers air to the cylinders of the engine on the successive intake strokes and with which air may be mixed carburetor fuel. The air cylinder is enclosed by a jacket which communicates with the circulatory cooling system of the engine, with the latter including means for preheating the fluid therein.

For a full and more complete understanding of the invention, reference may be had to the following description and accompanying drawing wherein:

Figure 1 is a view partially in section and partially in elevation of an internal combustion engine designed in accordance with the precepts of this invention with the sectional part being taken on the vertical plane.

Figure 2 is an enlarged detailed showing in elevation looking in the direction opposite from that from which Figure 1 is taken, and showing the conduit which communicates from the air cylinder to the engine manifold.

Figure 3 is an enlarged sectional detailed view taken about on the plane represented by the line 3—3 of Figure 1.

Figure 6 shows the position of the piston and valves at the completion of the compression stroke.

Figure 7 shows the position of the piston and valves at the completion of the power stroke.

Figure 8 shows the position of the piston and valves at the completion of the scavenging stroke.

Figure 9 is an enlarged detailed view showing the eccentric for operating the slide valve of the air piston and cylinder assembly. This view is taken about on the plane represented by the line 9—9 of Figure 1.

Figure 10 is an enlarged detailed view, partly in section and partly in elevation, showing the manner in which the carburetor fuel is introduced into the air as the latter comes from the air assembly; and Figure 11 is an enlarged detailed view in elevation of the engine manifold.

Figure 4:
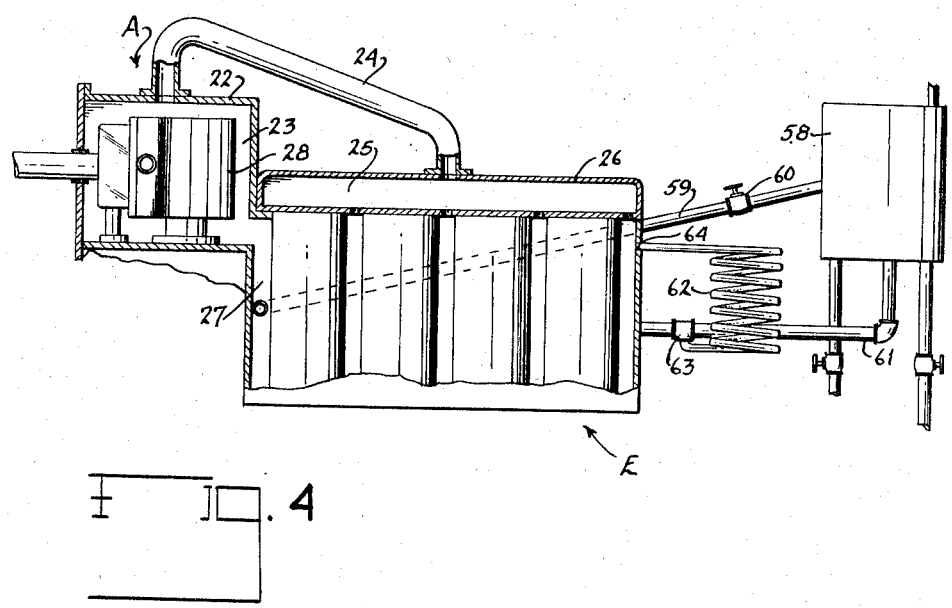
Figure 4 is another detailed view, largely diagrammatic, bringing out particularly the circulatory cooling system and the elements of the engine appurtenant thereto.

Referring now to the drawing wherein like reference characters denote corresponding parts and first more particularly to Figure 1, a four cylinder, four cycle internal combustion engine is therein illustrated and identified in its entirety by the reference character E. It will be understood that the engine E will include many standard and conventional parts and mechanisms which are neither illustrated nor described because they are not materially affected by the present invention. Only those parts of the engine E which enter into the improved operation afforded by the present invention are illustrated and described in detail.

The engine E includes a block 10 in which are formed four cylinders 11. Each of these cylinders 11 is a substantial duplicate of every other cylinder. Mounted for reciprocation in each cylinder 11 is a piston 12, and the pistons 12 are all alike. Each piston 12 is connected by means of a connecting rod 13 to a throw of a crankshaft 14. It will be noted that the throws of the crankshaft 14 are spaced one hundred and eighty degrees apart, two being on one side, two being on the other.

As the engine is a four cycle engine, each piston 12 will include a power stroke in one of the four strokes making up each cycle. Thus, on the power stroke, power is delivered from the piston 12 to the crankshaft 14; but, on the scavenging, intake, and compression strokes, the piston 12 is operated by power derived from the crankshaft 14, this being conventional practice in the internal combustion engine art.

Figure 5:
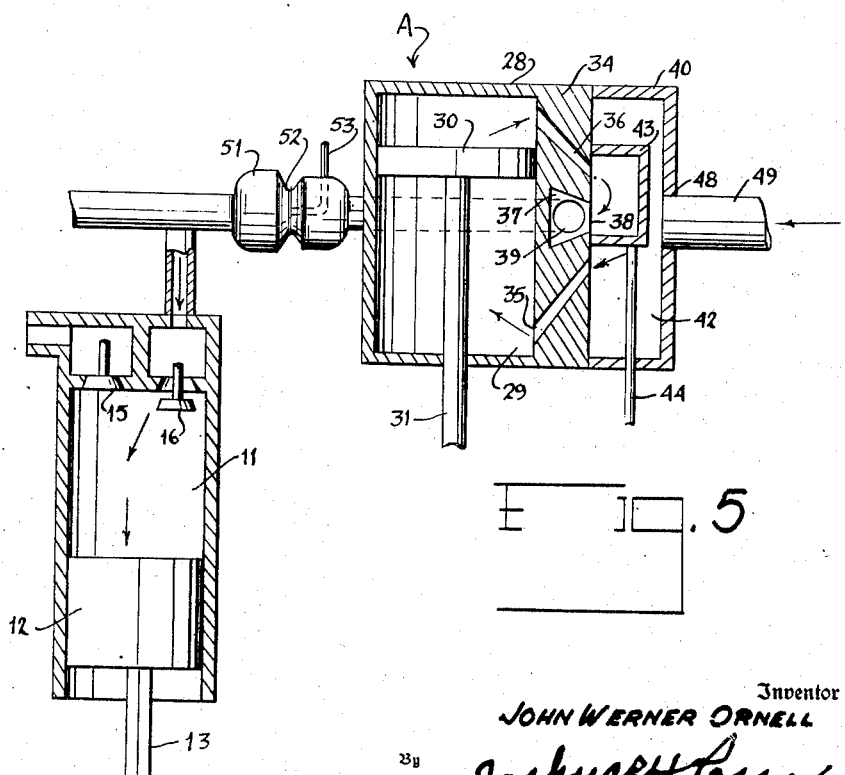
Figure 5 is another view that is largely diagrammatic which develops the relation of the air piston and cylinder assembly to one of the cylinders of the engine proper and shows particularly the position of the piston and valves at the completion of the intake stroke.

Associated with each cylinder 11 are a pair of valves which are more clearly depicted in Figure 5. These valves are designated 15 and 16. When the valve 16 is open, air may be delivered to the cylinders 11, and when the valve 15 is open, the spent gases of exhaustion are exhausted from the cylinders 11 on the scavenging stroke. The valves 15 and 16 for each of the cylinders 11 are operated from a valve camshaft 17. Connecting rods, such as shown at 18 and with which are associated the usual springs 19, may be employed to set up the operating connections between the valve camshaft 17 and the valves 15 and 16. A gear 20 on the crankshaft 14 and a pinion 21 on the camshaft 17 establishes the driving relation between these shafts in the proper gear ratio for causing opening and closing of the valves 15 and 16.

An air piston and cylinder assembly is referred to in its entirety by the reference character A and is shown as mounted at one end of the engine E. This assembly A comprises an outer jacket 22 which defines a chamber 23 through which a cooling medium is adapted to circulate. As shown in Figures 1 and 4 a conduit 24 establishes communication between the upper portion of this chamber and a chamber 25 formed in the head 26 of the engine E. The lower portion of the chamber 23 communicates with the chambers 27 that are disposed about the cylinders 11 in the block 10.

Positioned within the outer jacket 22 and in spaced relation with respect thereto so as to define the chamber 23, is a cylinder block 28 that is formed with a cylinder 29 in which reciprocates a piston 30 which is connected by a connecting rod 31 and link 32 to a throw 33 formed in the crankshaft 14.

As illustrated in Figure 1 and on an enlarged scale in Figure 5, the block 28 is formed on one side with a thickened wall portion 34. This wall 34 is formed with a pair of ducts 35 and 36 which communicate with opposite ends of the cylinder 29. The thickened wall portion 34 is also formed with a recess 37 which communicates with an opening 38 formed on the front face of the wall 34 and a port 39 formed on a side face of the wall 34. A casing 40 is secured over the exposed face of the thickened wall 34 as by the headed bolts shown at 41 in Figure 1. This casing 40 cooperates with the wall 34 to define a chamber 42. A slide valve 43 is positioned within this chamber 42 to slide over the face of the wall 34. In one position of the valve 43, communication between the duct 36 and opening 38 is established while the duct 35 is cut out; but in the other position, the duct 36 is cut out and communication is established between the duct 35 and the opening 38.

A connecting rod 44 is connected at one end to the slide valve 43 and passes through an opening in the casing 40 where its other end is connected to a link 45, as indicated by the connection 46. The link 45 is driven from an eccentric 47 that is mounted on the crankshaft 14 in a well-known manner. (See Figure 9.)

The casing 40 is formed with an inlet opening 48 in which is fitted at one end an intake conduit 49. This conduit 49 conducts air from the atmosphere to the air piston and cylinder assembly A.

As is shown more clearly in Figure 3, a conduit 50 communicates with the port 39 in the wall 34. The conduit 50 then extends to a carburetor 51 of the Venturi tube type. This carburetor 51 includes a waist 52 and a fuel inlet tube 53 has its open end located substantially at the waist 52. The fuel tube 53 is connected to a fuel tank 54 from which the fuel may be forced under pressure, or by locating the fuel tank 54 above the level of the open end of the tube 53, gravity action may be used as the means for feeding the fuel. A conduit 55 extends from the carburetor 51 to an engine manifold 56. Upon referring to Figure 11, it will be noted that the engine manifold includes four tubular connections 57, each of which is substantially the same as every other of these connections. Each tubular connection 57 connects the manifold 56 with one of the cylinders 11. Also it will be noted that from Figure 3, the valve 16 is interposed in the connection so as to determine whether or not air is delivered from the manifold 56 to the particular cylinder 11.

As above explained, a cooling medium such as water circulates through the chambers 23, 25, and 27. If the engine E is mounted on an automobile, a radiator will ordinarily be included and will be in communication with these chambers. However, in the cases of stationary engines the city or municipal water supply is usually availed of for supplying water to the cooling system. Upon referring to Figure 4 it will be noted that a source of water supply is represented by a tank shown at 58. A pipe 59 connects this tank 58 to the chambers 27 at one point. The pipe 59 may include a valve shown at 60. Another pipe 61 connects the tank 58 to the chambers 27 at another point. A coil indicated at 62 may be tapped into the pipe 61 at 63 and its other end connected to the chambers 27 as shown at 64. This coil 62 is adapted to have a torch or other appropriate heating means applied thereto so as to quickly heat the water in the chambers 23, 25, and 27. This facilitates starting of the engine and during the initial stages of operation insures that the air, which is delivered from the assembly A to the cylinders 11, will be preheated.

Operation

While the operation of the above described mechanism is believed to be obvious from the description of the parts, it will be described by first referring to Figures 5, 6, 7, and 8 and identifying the position of the valves 15 and 16 on each stroke of the cycle.

Figure 5 shows the piston 12 at the completion of the intake stroke. During the interval in which this stroke takes place, the valve 16 is opened and the valve 15 closed. Thus, air is delivered by positive displacement from the assembly A to this particular cylinder 11. It will be noted that, at the same time the cylinder 12 is making its intake stroke, the piston 30 will be making a stroke which forces the air from the cylinder 29 through the duct 36, opening 38, passage 37, port 39, and conduit 50 to the carburetor 51 and from the carburetor 51 through the conduit 55, manifold 56, and one of the connections 57 to the particular cylinder 11.

The next stroke is the compression stroke, the completion of which is depicted in Figure 6. During the making of this stroke, both valves 15 and 16 are closed. Thus, the mixture of air and fuel is compressed.

The next stroke is the power stroke which is represented in Figure 7, and during this stroke the valves 15 and 16 remain closed.

The next stroke is the scavenging or exhaust stroke, the completion of which is represented in Figure 8. During the making of this stroke, the valve 16 remains closed while the valve 15 is open permitting the spent gases of combustion to be exhausted through the exhaust represented diagrammatically at 65.

It is evident that during each cycle each piston 12 makes four strokes. Moreover, for each stroke of each piston 12, the air piston 30 makes a stroke. However, due to the opening and closing of the valves 16, which are controlled from the camshaft 17, only one of the cylinders 11 is in communication with the cylinder 29 as the piston 30 makes its stroke. Thus, air is moved by positive displacement from this cylinder 29 into the particular cylinder 11 which is making its intake stroke.

While a preferred specific embodiment of the invention is hereinbefore set forth, it is to be clearly understood that the invention is not to be limited to the exact constructions, mechanisms, and devices illustrated and described, because various modifications of these details may be provided in putting the invention into practice within the purview of the appended claims.

What is claimed is:

1. In an internal combustion engine including a plurality of cylinders in which the combustion of fuel is adapted to take place and a crankshaft, an air piston and cylinder assembly for delivering air to said cylinders by positive displacement, a cylinder block formed with a bore and having a wall formed with ducts communicating with opposite ends of said bore, said wall also being formed with a recess which opens into the face of said wall between said ducts and which communicates with a port and one side of said wall, a slide valve slidable over said face and adapted to establish communication with either of said ducts and said opening, means for conducting said air from said port to said cylinders of said engine, means for driving said slide valve from said crankshaft, a piston in said bore, and a connecting rod operatively connecting said piston to said crankshaft.

2. In an internal combustion engine of the character described, the combination of: an engine block formed with a plurality of cylinders in which the combustion of fuel is adapted to take place and with water jackets enclosing said cylinder, an air piston and cylinder assembly including a cylinder surrounded by a water jacket communicating with said water jackets, a piston in the cylinder of said assembly for delivering air to the cylinders of said block by positive displacement, means for circulating water through said water jackets, and means for preheating the water so circulated.

3. In an internal combustion engine of the character described, the combination of: an engine block formed with a plurality of cylinders in which the combustion of fuel is adapted to take place and with water jackets enclosing said cylinder, a head on said block and having a water jacket communicating with said water jackets, and an air piston and cylinder assembly including an air cylinder enclosed by a water jacket that communicates with the water jackets in said block and a head, a piston in said cylinder for delivering air to said cylinders and said block by positive displacement, and means for circulating water through said water jackets and including a coil that is adapted to have heat applied thereto to preheat the water so circulated.

JOHN WERNER ORNELL.

REFERENCES CITED

The following references are of record in the file of this patent:

UNITED STATES PATENTS

| Number | Name | Date |
|---|---|---|
| 789,047 | Mertens | May 2, 1905 |
| 966,953 | Rowing et al. | Aug. 9, 1910 |
| 1,048,922 | Westway | Dec. 31, 1912 |
| 1,087,835 | Schickel | Feb. 17, 1914 |
| 1,160,419 | Lawrence | Nov. 16, 1915 |
| 1,298,256 | Proffitt | Mar. 25, 1919 |
| 1,521,807 | Ford | Jan. 6, 1925 |
| 1,576,357 | Pierce | Mar. 9, 1926 |
| 1,634,468 | Muller | July 5, 1927 |
| 1,677,305 | Sperry | July 17, 1928 |
| 1,740,790 | Stanton | Dec. 24, 1929 |
| 1,911,991 | Cosby | May 30, 1933 |
| 2,180,663 | Bergeron et al. | Nov. 21, 1939 |